United States Patent [19]  [11] 4,062,465
Kovatch et al.  [45] Dec. 13, 1977

[54] POWERED LOADING SYSTEM

[75] Inventors: George N. Kovatch, Monroeville; Ronald E. Vaill, Irwin; William E. Kepes, Trafford, all of Pa.

[73] Assignee: Westinghouse Electric Corporation, Pittsburgh, Pa.

[21] Appl. No.: 666,811

[22] Filed: Mar. 15, 1976

[51] Int. Cl.$^2$ .............................................. B60P 1/64
[52] U.S. Cl. .................................... 214/516; 254/5 R
[58] Field of Search .............. 214/515, 516, 517, 390, 214/512; 254/5 R, 5 B, 5 C, 45; 296/35 A

[56] References Cited

U.S. PATENT DOCUMENTS

| 3,272,546 | 9/1966 | Cooley | 214/516 X |
| 3,526,331 | 9/1970 | Marshall et al. | 214/516 X |
| 3,647,014 | 3/1972 | Wilke et al. | 214/515 |
| 3,752,345 | 8/1973 | Molis | 214/515 |
| 3,865,266 | 2/1975 | Redelman | 214/515 |

Primary Examiner—Albert J. Makay
Attorney, Agent, or Firm—J. J. Wood

[57] ABSTRACT

A powered loading system is disclosed for loading and unloading a heavy load-carrying module onto a vehicle for transport. The module is supported for movement on casters and, additionally, it includes rollers and a slotted probe member. The transport vehicle for receiving the module includes ramp members for engaging the rollers on the module. A motor on the vehicle is coupled to a jackscrew which is attached to a movable block member. A hook member is supported on the block for displacement in an arcuate path normal to the ground plane. With the rollers on the module in position on the ramp members and deplacement impending, when the motor is actuated, the hook member engages and disengages with the slotted probe member for raising and lowering the module for, respectively, loading and unloading the module on the transport vehicle.

7 Claims, 8 Drawing Figures

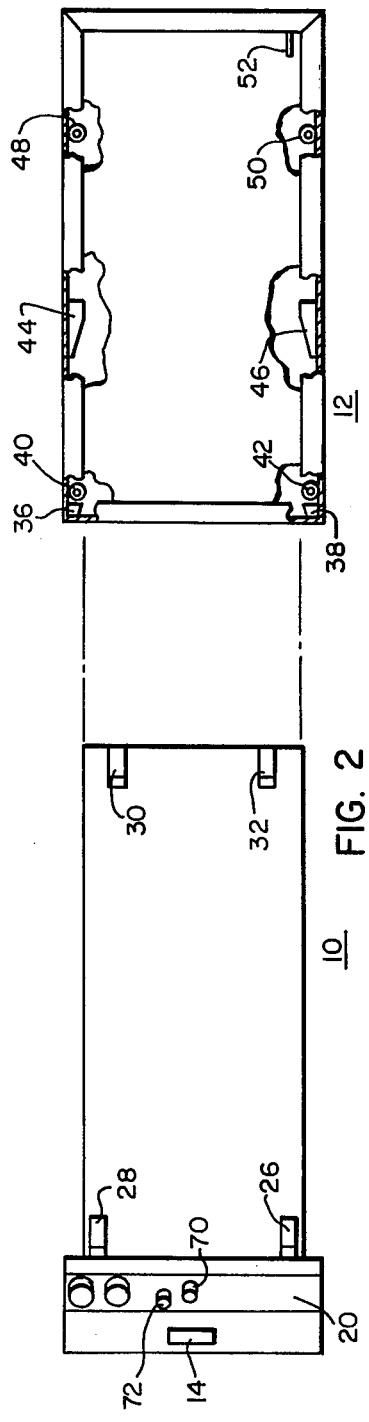
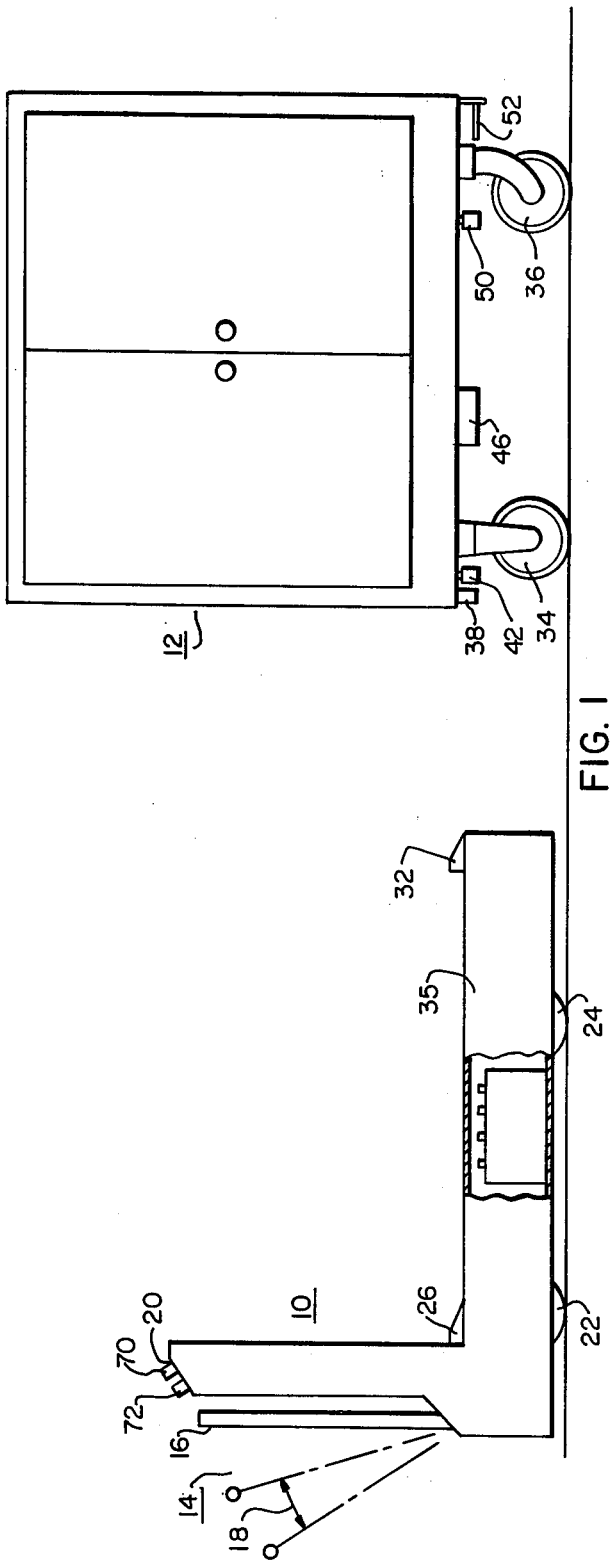
FIG. 1
FIG. 2

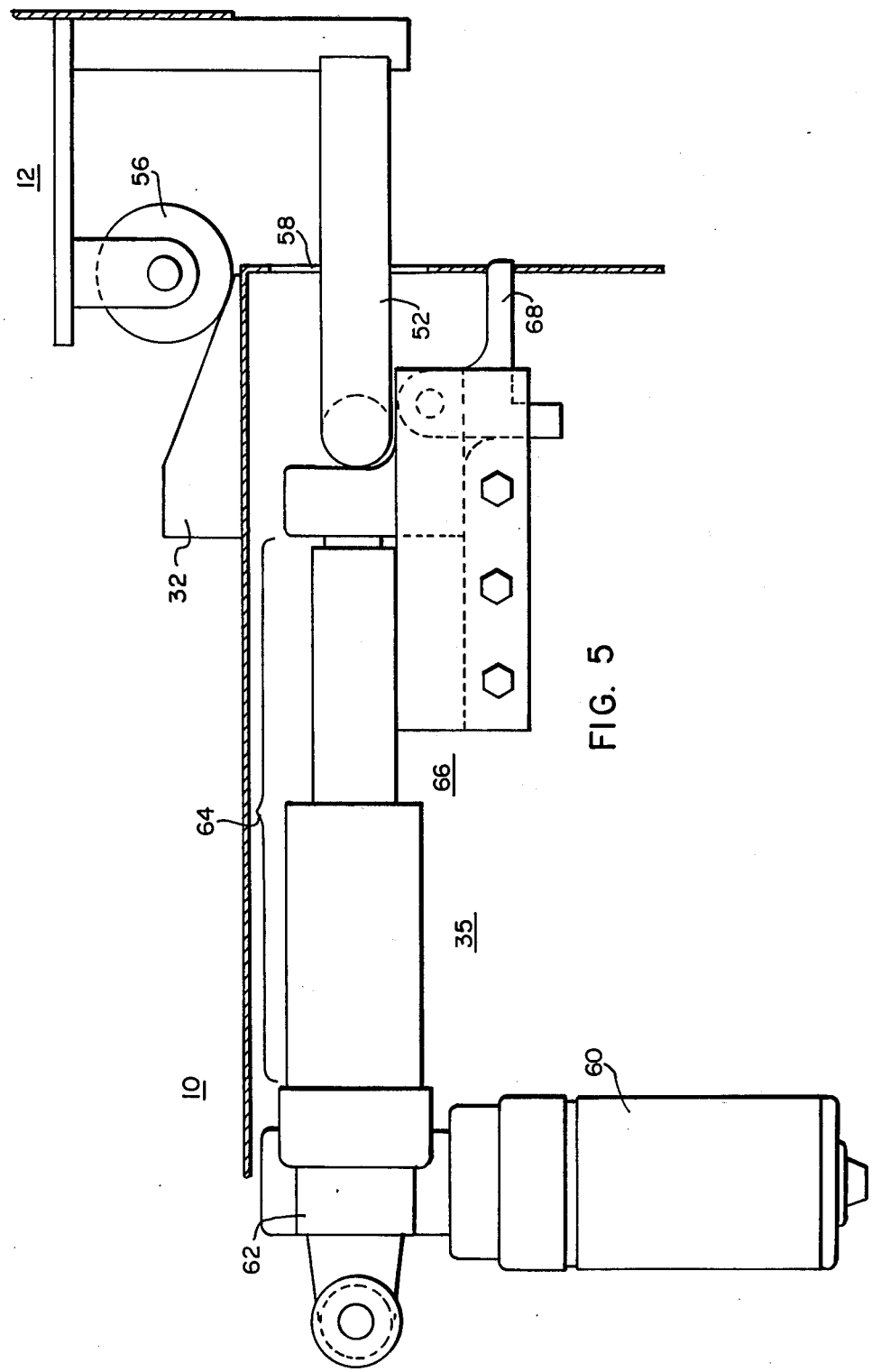

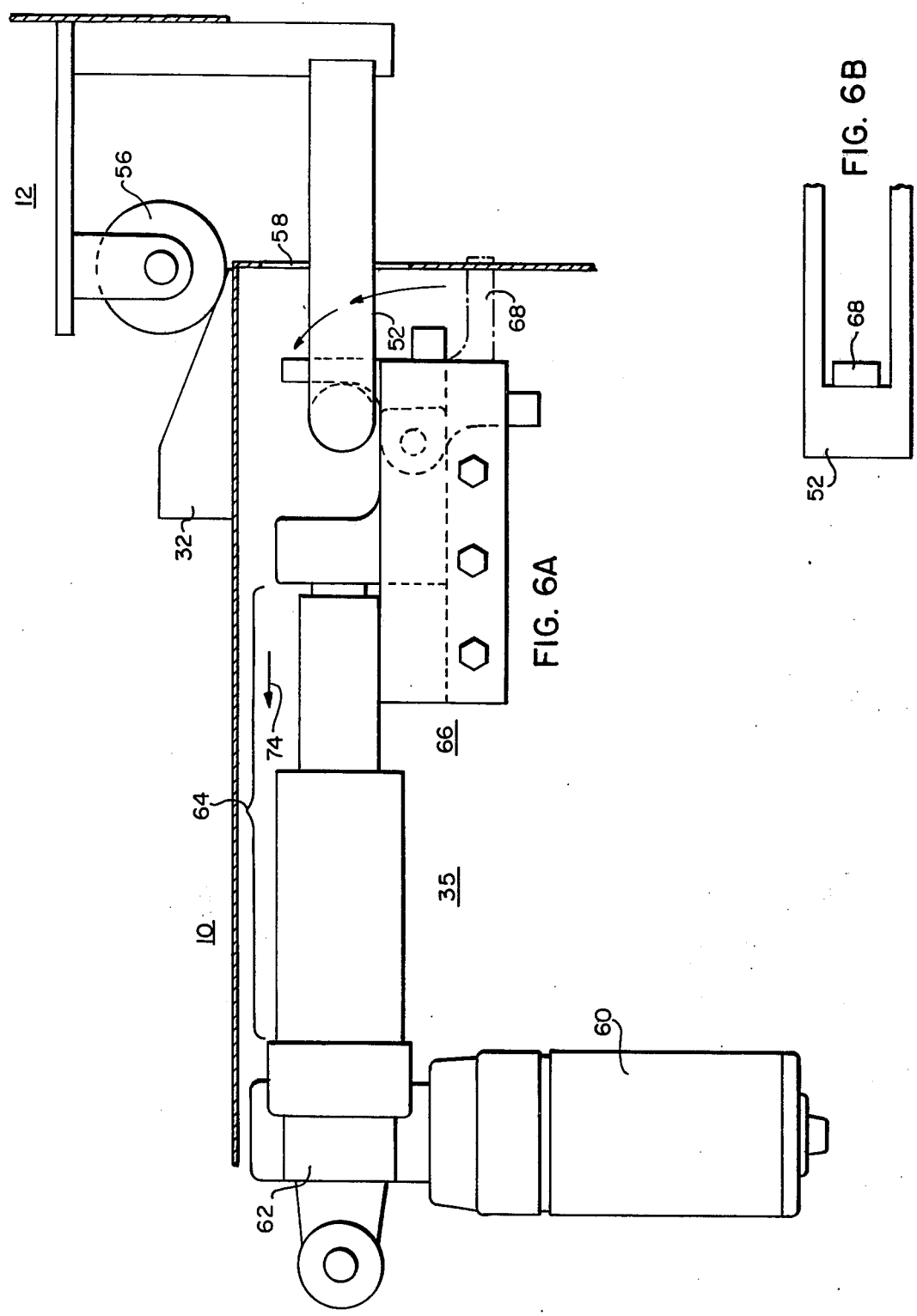

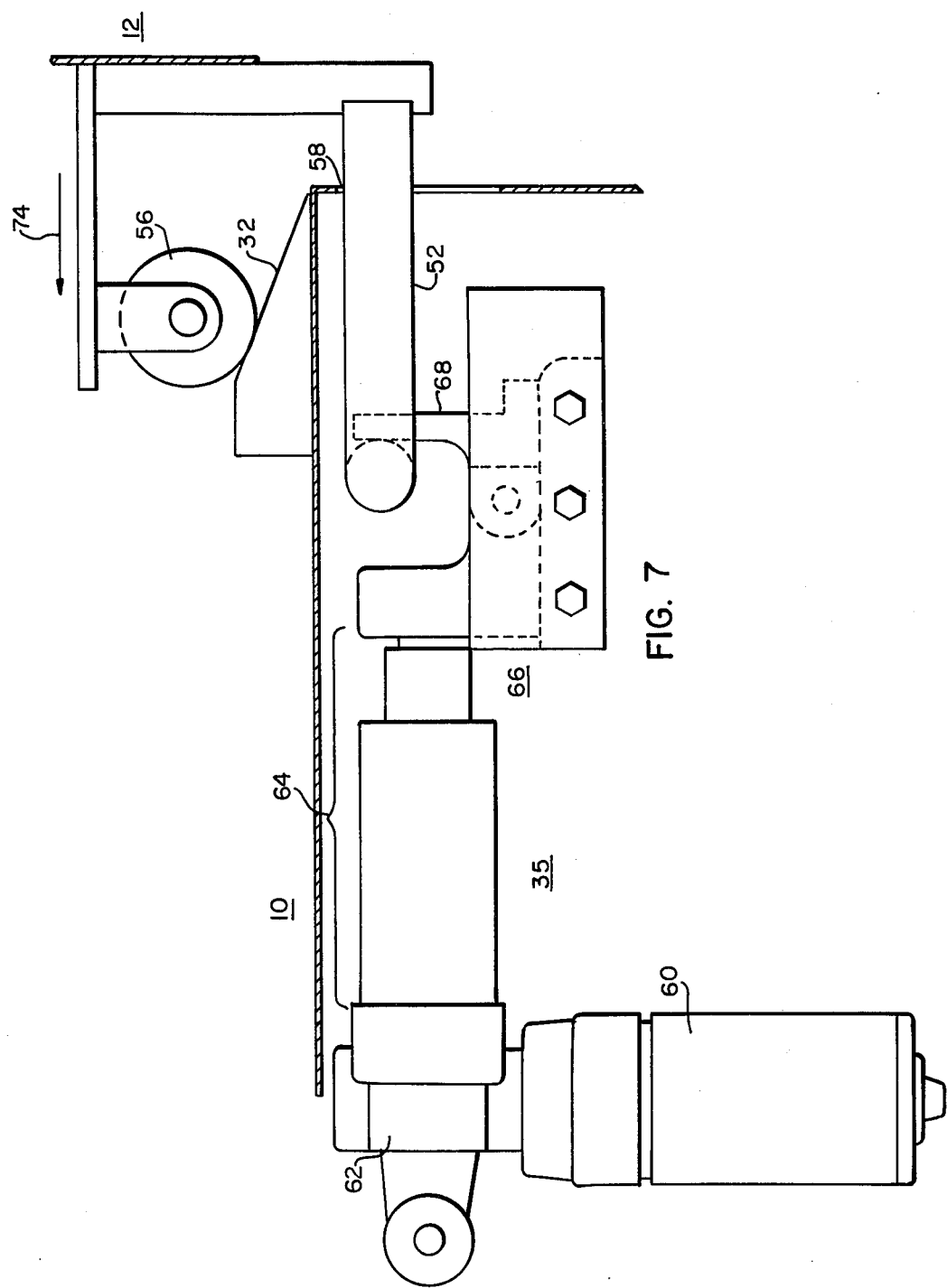

POWERED LOADING SYSTEM

CROSS-REFERENCE TO RELATED APPLICATIONS

See copending application entitled Guidance Control System for a Traction Vehicle No. 642,805, filed on Dec. 22, 1975 in the name of Ricardo A. Diaz;

copending application entitled Automatic Data Processing and Control System No. 642,806, filed on Dec. 22, 1975 in the names of F. T. Thompson, Ricardo A. Diaz and Theodore M. Heinrich;

copending application entitled Self Monitoring and Sequencing System for a Traction Vehicle No. 642,804, filed on Dec. 22, 1975 in the names of Gary E. Baumgart and Ricardo A. Diaz;

and copending application entitled

Supervisory Control System No. 642,803, filed on Dec. 22, 1975 in the names of Ricardo A. Diaz and Gary E. Baumgart, all assigned to the same assignee as the present invention.

BACKGROUND OF THE INVENTION

1. Field of the Invention

This invention relates to a system for powered loading and unloading of a heavy load-carrying module onto a transport vehicle.

2. Description of the Prior Art

In prior art arrangements, one frequently encounters the utilization of a load carrying module together with a transport vehicle which is under the discipline of a guidance system. In such systems the module is loaded onto the vehicle and then unloaded at a preselected destination, the now empty vehicle proceeding to a new rendezvous for further assignments.

In the past, physically speaking, the loading and unloading of the module from the vehicle was a relatively arduous task. For example, a loaded module with a gross weight of up to 1,000 pounds had to be pushed to the back of the transport vehicle by means of a ramp on the vehicle with cooperating skids on the module, the whole being then locked in place by a mechanical latching arrangement of some sort. Since the module was heavy, the operating personnel would frequently resort to a running start to gain momentum to push the module up the ramp. This technique for loading obviously, at best, produced a fortuitous mating of vehicle and module. The unloading operation, while devoid of the problems of alignment, nevertheless was physically demanding, particularly of female personnel. When the mechanical latch was unfastened, the module had to be dislodged by brute force without any mechanical advantage.

The prior art arrangement described had a deleterious effect on overall operations. Obviously, either physically strong personnel were required or, alternatively, the module had to be loaded to less than full capacity. The improvised running-start technique and the fortuitous results which it afforded abused the equipment well beyond normal wear and tear. The heavily-loaded module, however successfully loaded, gave rise to still further improvisation: at the destination station the loaded module was left on the vehicle until, by normal consumption of the contents, the gross weight was reduced to a manageable size.

The instant invention provides a powered system for loading a module onto a vehicle in which loading and unloading can be accomplished expeditiously with very little physical effort on the part of the operatives.

SUMMARY OF THE INVENTION

A powered loading system is claimed in which a modular member and a transport vehicle are arranged for cooperative loading and unloading. The modular member comprises a plurality of rollers and probe means. The transport vehicle is dimensioned to receive the modular member and comprises ramp means for engaging said rollers. Further, the transport vehicle includes motor means, linear displacement means, a block assembly and a hook means. The linear displacement means is coupled at one end to the motor means, while the other end is attached to said block assembly. The hook means is supported on the block assembly and arranged for movement in an arcuate path, the plane of which is normal to the ground. With the rollers of the modular member in position and displacement impending, when the motor means is actuated, the hook means engages and disengages with said probe means, respectively, to raise and lower said modular member with reference to said ramp means, to effect loading and unloading of said modular member.

DESCRIPTION OF THE DRAWINGS

FIG. 1 is a side view showing the vehicle and the module in position preparatory to loading in accordance with the invention;

FIG. 2 is a top view of the vehicle and module shown in FIG. 1;

FIG. 5 is a schematic of the loading mechanism with the module in position, with loading impending;

FIG. 6A is a schematic similar to FIG. 5 showing the module being raised;

FIG. 6B is a sectional view depicting the engagement of the hook and probe means; and FIG. 7 is a schematic similar to FIGS. 5 and 6A showing the module fully loaded on the vehicle.

DESCRIPTION OF THE PREFERRED EMBODIMENT

Figure 3:
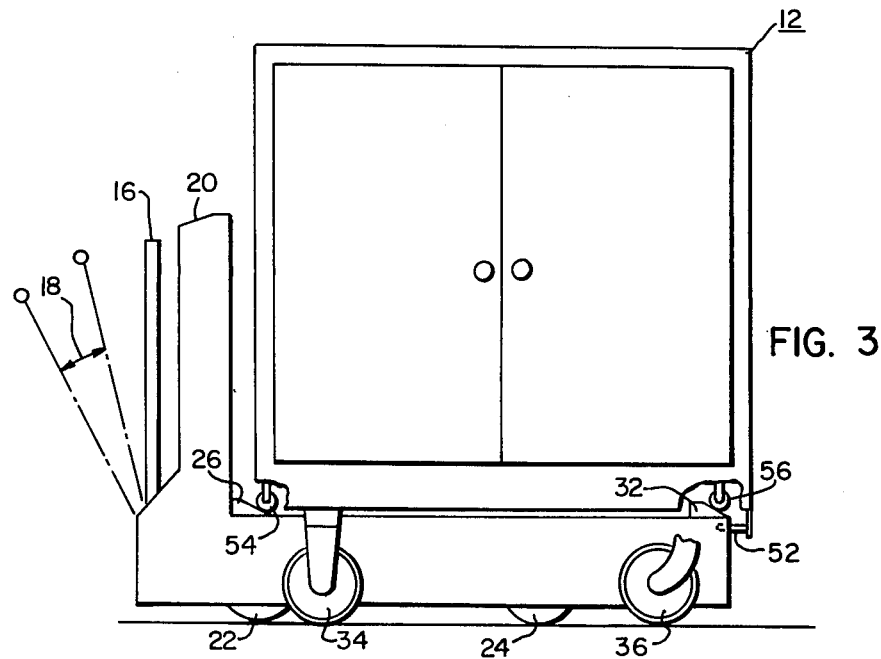
FIG. 3 is a pictorial view showing the module in position on the vehicle just short of full insertion.

Referring now to FIGS. 1 and 2, there is depicted a transport or traction vehicle, indicated generally at 10, in position to receive a module indicated generally at 12. Although the invention to be described is of general and independent applicability, the module loading system of this invention finds particular utility as part of the automatic transport system (ATS) described in the copending applications cited supra. The transport vehicle 10 may be operated automatically or manually. In the automatic mode, as described, in the copending applications entitled Guidance Control System for a Traction Vehicle Ser. No. 642,805, filed on Dec. 22, 1975 in the name of Ricardo A Diaz;

copending application entitled Automatic Data Processing and Control System Ser. No. 642,806, filed on Dec. 22, 1975 in the names of F. T. Thompson, Ricardo A. Diaz and Theodore M. Heinrich; and copending application entitled Supervisory Control System Ser. No. 642,803, filed on Dec. 22, 1975 in the names of Ricardo A. Diaz and Gary E. Baumgart, the vehicle 10 is in two-way radio communication with a central controller, communication being had by means of a plurality of segmented closed loop antennae embedded beneath the surface along which the vehicle is to travel. The transport vehicle 10 carries the module 12 to assigned destination stations as described and claimed in the copending applications cited supra; loading and unloading of the module 12 is described and claimed in the instant application.

A handle, indicated generally at 14, on the transport vehicle 10 has a stored position indicated at 16 when operated on the automatic mode, as well as a normal operating range 18 when utilized in the manual mode. The selection of the automatic or manual mode, as well as emergency stopping of the vehicle, is accomplished by means of a plurality of dials and push buttons positioned on a console indicated at 20. The vehicle is driven by means of a steering wheel 22 — traction for forward and reverse displacement being provided by means of dual wheels (only one of which is shown in FIG. 1) indicated generally at 24. The vehicle 10 includes four ramp members identified at 26, 28, 30 and 32. The transport vehicle 10 also includes a motor, linear actuator and L-shaped hook member housed within the portion 35; however, a description of these members will await a description of FIGS. 5, 6A, 6B and 7.

The module 12 is mounted on four casters, only two of which (34, 36) may be seen in FIG. 1. As best seen in FIG. 2, the module 12 is dimensioned to telescope over the vehicle 10, and its undercarriage is especially prepared to facilitate this arrangement. One end of the undercarriage includes tapered guides 36, 38 and roller assemblies 40, 42. Longitudinally along the underside are tapered guides 44, 46 and rollers 48, 50. The module 12 also includes a probe means indicated at 52.

Figure 4:
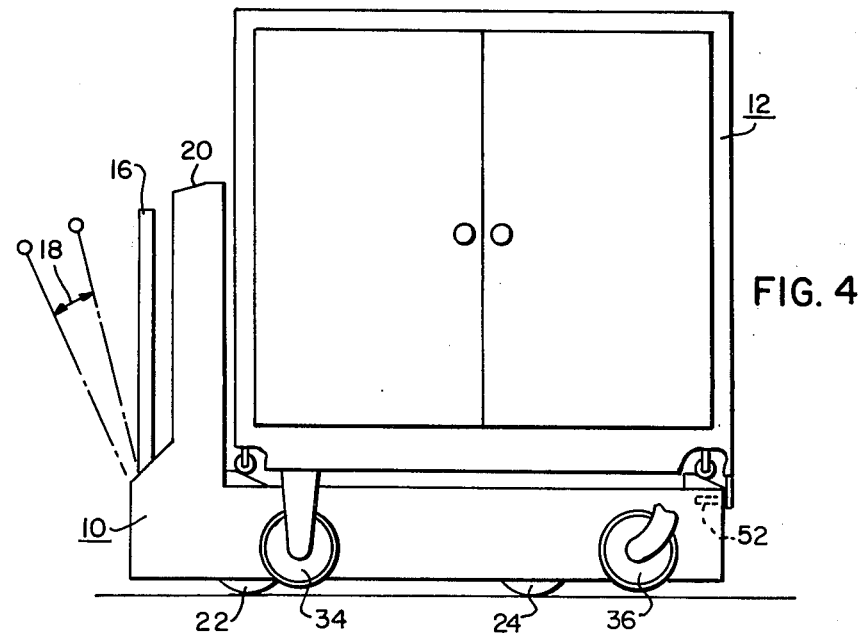
FIG. 4 is a pictorial view depicting full insertion with the casters of the module raised free of the ground plane.

Referring now to FIGS. 3 and 4, the module 12 also includes four rollers, only two of which may be seen at 54 and 56. These rollers pairs have the same alignments as the ramp members 26, 28, 30 and 32 shown in the view of FIG. 2. Thus, roller 54 and the companion roller are aligned with ramps 26 and 28, respectively, and roller 56 and its companion roller are aligned with ramps 32 and 30, respectively.

As best shown in FIGS. 5, 6A and 7, the transport vehicle includes a recessed opening 58 to receive the probe means 52. The vehicle 10 within portion 35 carries a DC motor 60 which is coupled to a Hypoid gearing assembly 62 for displacing a linear actuator or jackscrew 64. The actuator 64 is fastened at one end to the loading assembly block indicated generally at 66. The assembly block 66 also includes an L-shaped loading mechanism hook 68 arranged to be displaced in an arcuate path normal to the ground plane.

The motor-linear actuator 60-62-64 will not be described in detail because it is a standard commercially-available item. For example, one such motor-linear actuator is made and sold by Duff-Norton Company, P.O. Box 1719, Charlotte, North Carolina 28201. The DC motor 60 is powered by a 12v DC battery which is available on the vehicle 10.

When the loading system is utilized, the transport vehicle 10 is steered into position to receive the module 12, as shown in FIG. 1. The module 12 is placed over the vehicle 10, as shown in FIG. 3, either by driving the vehicle 10 into the module 12, or pushing the module 12 into the vehicle 10. Note that rollers are about to ride up the ramps 26, 32.

The loading mechanism is now in the position shown in FIG. 5. In this position the load button 70 on the console 20 is pressed to actuate the motor 60. As shown in FIG. 6A, the jackscrew 64 is displaced in the direction of the arrow 74, and the loading hook 68 is displaced in an arcuate path normal to the ground plane and into the slotted portion of probe 52, as shown in FIG. 6B. As the jack-screw 64 continues to advance in the direction of the arrow 74, the module 12 is pulled up the ramp members. (In FIG. 7, roller 56 has advanced up the ramp 32.) The motor 60 continues to be actuated until deenergized by limit switches (not shown). When the module is fully loaded, as shown in FIG. 4, the casters 34, 36 are free of the ground, and the module 12 may be transported automatically or manually to a desired destination.

During unloading of the module, the lower (unload) button 72 is pressed. This reverses the rotation of the DC motor 60 and the jackscrew switch 64, allowing the hook 68 to rotate in the opposite direction (clockwise, as viewed in FIGS. 5, 6A and 7), and the module 12 is lowered down the ramps 26, 28, 30 and 32. Again, limit switches deenergize the motor 60 when module 12 has been lowered to the ground plane. A light (not shown) on the console 20 advises the operator that the module 12 is unloaded and the vehicle 10 can then be driven from beneath the module 12.

What is claimed is:

1. A powered loading system comprising in combination:
    a modular member comprising a plurality of rollers and probe means;
    a transport vehicle for receiving said modular member, comprising ramp means for engaging said rollers;
    motor means, a linear displacement means, a block assembly and a hook means on said transport vehicle, said motor means being coupled to said linear displacement means, said linear displacement means being coupled to said block assembly, said block assembly supporting said hook means and including means assisting in the displacement of said hook means in an arcuate path, whereby when said rollers are in position and displacement is impending on said ramp means, said motor means is actuated for directional rotation, and said hook means engages and disengages with said probe means to raise and lower said modular member with respect to said ramp means for respectively loading and unloading said modular member with reference to said transport vehicle.

2. A powered loading system according to claim 1 wherein said probe means is a slotted member on said modular member, and said hook means is a substantially L-shaped member pivoted on said block assembly to swing into and out of engagement with said slotted member.

3. A powered loading system according to claim 1 wherein said linear displacement means is a jackscrew.

4. A powered loading system according to claim 1 wherein said modular member is supported on casters and said ramp means has a vertical height which on loading is sufficient to elevate said casters free of the ground plane.

5. A powered loading system comprising in combination;

a modular member supported for movement on casters, and comprising four rollers, and a slotted probe member;

a transport vehicle for receiving said modular member comprising four ramp members for engaging said four rollers;

a motor, a jackscrew, a block member and a hook means on said transport vehicle, said motor being coupled to said jackscrew, said jackscrew being coupled to said block member, said block member supporting said hook means for arcuate displacement, whereby with the rollers in position in said ramps and displacement impending, when the motor is actuated for directional rotation, said hook means engages and disengages with said slotted probe member to raise and lower said modular member on said ramp members for respectively loading and unloading said modular member with reference to said transport vehicle.

6. A powered loading system according to claim 5 wherein said four ramp members and said four rollers are arranged in cooperating pairs which are not aligned in the direction of loading and unloading.

7. A powered loading system according to claim 5 wherein said motor is a DC motor coupled by gearing to said jackscrew.

* * * * *